(12) United States Patent
Karthik et al.

(10) Patent No.: US 8,737,536 B2
(45) Date of Patent: *May 27, 2014

(54) RECOVERY OF DATA FROM A MULTI CARRIER SIGNAL

(75) Inventors: Muralidhar Karthik, Sengkang (SG); George A. Vlantis, Sunnyvale, CA (US)

(73) Assignees: STMicroelectronics, Inc., Carrollton, TX (US); STMicroelectronics Asia Pacific Pte, Ltd., Singapore (SG)

( * ) Notice: Subject to any disclaimer, the term of this patent is extended or adjusted under 35 U.S.C. 154(b) by 891 days.

This patent is subject to a terminal disclaimer.

(21) Appl. No.: 12/579,935

(22) Filed: Oct. 15, 2009

(65) Prior Publication Data

US 2010/0098198 A1 Apr. 22, 2010

Related U.S. Application Data

(60) Provisional application No. 61/105,704, filed on Oct. 15, 2008, provisional application No. 61/158,290, filed on Mar. 6, 2009.

(51) Int. Cl.
H04B 3/46 (2006.01)

(52) U.S. Cl.
USPC .......................... 375/326; 375/346; 375/316

(58) Field of Classification Search
USPC ................ 375/260, 316, 259, 346, 326, 324; 455/214; 329/311, 315, 345, 357
See application file for complete search history.

(56) References Cited

U.S. PATENT DOCUMENTS

| | | |
|---|---|---|
| 5,479,446 A | 12/1995 | Mourot |
| 5,852,630 A | 12/1998 | Langberg et al. |
| 6,680,901 B1 | 1/2004 | Yamamoto et al. |
| 8,170,516 B2 | 5/2012 | Dehos et al. |
| 8,428,158 B2 | 4/2013 | Maltsev et al. |
| 2002/0146063 A1 | 10/2002 | Gorokhov et al. |
| 2002/0181407 A1 | 12/2002 | Khullar et al. |
| 2005/0201268 A1 | 9/2005 | Aoki et al. |
| 2006/0013326 A1 | 1/2006 | Yoshida |
| 2006/0072692 A1 | 4/2006 | Gifford et al. |
| 2006/0133457 A1 | 6/2006 | Wang et al. |
| 2006/0209973 A1 | 9/2006 | Gorokhov et al. |
| 2006/0209979 A1* | 9/2006 | Sandell et al. ............... 375/267 |

(Continued)

OTHER PUBLICATIONS

Karthik Muralidhar and Kwok Hung Li, "A Low-Complexity Kalman Approach for Channel Estimation in Doubly-Selective OFDM Systems", IEEE Signal Processing Letters, vol. 16, No. 7, Jul. 2009, pp. 632-635.

(Continued)

*Primary Examiner* — Shuwang Liu
*Assistant Examiner* — Helene Tayong
(74) *Attorney, Agent, or Firm* — Graybeal Jackson LLP

(57) ABSTRACT

In an embodiment, a multi-carrier signal (e.g., an OFDM signal) is received over a channel. Indicators of interference and the channel response at a carrier frequency of the signal are determined, and compared. If the indicator of interference has a particular relationship to the indicator of the channel response, then a data value transmitted at the carrier frequency is recovered from a data value received at the carrier frequency according to a particular data-recovery algorithm. Because the particular data-recovery algorithm may be faster than a conventional data-recovery algorithm, recovering one or more data values with the particular algorithm may increase the speed at which data is recovered from a multi-carrier signal as compared to using a conventional data-recovery algorithm.

49 Claims, 11 Drawing Sheets

(56) References Cited

U.S. PATENT DOCUMENTS

| | | | |
|---|---|---|---|
| 2007/0133696 A1 | 6/2007 | Iancu et al. | |
| 2007/0133699 A1* | 6/2007 | Roh et al. | 375/260 |
| 2007/0248151 A1 | 10/2007 | Kim et al. | |
| 2007/0297522 A1* | 12/2007 | Baggen et al. | 375/260 |
| 2008/0144486 A1 | 6/2008 | Wilhelmsson et al. | |
| 2008/0219343 A1* | 9/2008 | Wu et al. | 375/232 |
| 2008/0225934 A1* | 9/2008 | Mourad et al. | 375/227 |
| 2009/0052566 A1 | 2/2009 | Maltsev et al. | |
| 2009/0103568 A1 | 4/2009 | Garba et al. | |
| 2009/0154625 A1* | 6/2009 | Kwak et al. | 375/359 |
| 2009/0239494 A1 | 9/2009 | Park et al. | |
| 2009/0279623 A1 | 11/2009 | Wu et al. | |
| 2010/0027698 A1 | 2/2010 | Kim et al. | |
| 2010/0103877 A1 | 4/2010 | Wang et al. | |
| 2010/0166118 A1 | 7/2010 | Mantravadi et al. | |
| 2011/0176626 A1 | 7/2011 | Liao et al. | |
| 2011/0211630 A1* | 9/2011 | Nakahara et al. | 375/232 |
| 2012/0045008 A1 | 2/2012 | Karthik et al. | |
| 2012/0114069 A1 | 5/2012 | Karthik et al. | |
| 2012/0155425 A1 | 6/2012 | Budianu et al. | |
| 2013/0235946 A1 | 9/2013 | Budianu et al. | |

OTHER PUBLICATIONS

Karthik Muralidhar, Evelyn Kurniawati, Samsudin NG, "Further Results on the VSSO Kalman Channel Estimator for Doubly-Selective OFDM Systems", pp. 4.

Osvaldo Simeone, Yeheskel Bar-Ness, and Umberto Spagnolini, "Pilot-Based Channel Estimation for OFDM Systems by Tacking the Delay-Subspace", IEEE Transactions on Wireless Communications, vol. 3, No. 1, Jan. 2004, pp. 315-325.

Zijian Tang, Rocco Claudio Cannizzaro, Geert Leus, and Paolo Banelli, "Pilot-Assisted Time-Varying Channel Estimation for OFDM Systems", IEEE Transactions on Signal Processing, vol. 55, No. 5, May 2007, pp. 2226-2238.

M. R. Raghavendra, S. Bhashyam, and K. Giridhar, "Exploiting Hopping Pilots for Parametric Channel Estimation in OFDM Systems", IEEE Signal Processing Letters, vol. 12, No. 11, Nov. 2005, pp. 737-740.

Baoguo Yang, Khaled Ben Letaief, Roger S. Cheng, and Zhigang Cao, "Channel Estimation for OFDM Transmission in Multipath Fading Channels Based on Parametric Channel Modeling", IEEE Transactions on Communications, vol. 49, No. 3, Mar. 2001, pp. 467-479.

Karthik Muralidhar, Li Kwok Hung and Ying Chang Liang, "Low-Complexity Equalisation Methods for OFDM Systems in doubly Selective Channels", Vehicular Technology Conference, 2008. VCT Spring 2008. IEEE, May 11-14, 2008, Singapore, pp. 683-687.

S. M. Kay, "Fundamentals of Statistical signal processing: Estimation Theory," vol. 1, Prentice Hall: New Jersey, 1993, pp. 6.

Proakis, "Digital Communications," McGraw Hill, 1995, pp. 4.

Xiaodong Cai and Georgios B. Giannakis, "Bounding Performance and Suppressing Intercarrier Interference in Wireless Mobile OFDM", IEEE Transactions on Communications, vol. 51, No. 12, Dec. 2003, pp. 2047-2056.

Paolo Banelli, Rocco Claudio Cannizzaro, and Luca Rugini, "Data-Aided Kalman Tracking for Channel Estimation in Doppler-Affected OFDM Systems", ICASSP 2007, IEEE 2007, pp. 133-136.

Hongmei Wang, Xiang Chen, Shidong Zhou, Ming Zhao, and Yan Yao, "Letter—Low-Complexity ICI Cancellation in Frequency Domain for OFDM Systems in Time-Varying Multipath Channels", IEICE Trans. Commun., vol. E89-B, No. 3, Mar. 2006, pp. 1020-1023.

U.S. Appl. No. 12/579,969, entitled: "Recovery of Data From a Multi Carrier Signal", filed Oct. 15, 2009, pp. 55.

U.S. Appl. No. 12/963,569, entitled: "Accounting for Inter Carrier Interference in Determining a Response of an OFDM Communication Channel", filed Dec. 8, 2010, pp. 66.

DVB Mobile TV—DVB-H—DVB-SH—DVB-IPDC, http://www.dvb-h.org/ p. 1.

IEEE 802.11—Wikipedia, the free encyclopedia, http://en.wikipedia.org/wiki/IEEE_802.11, pp. 13.

IEEE 802.16—Wikipedia, the free encyclopedia, http://en.wikipedia.org/wiki/IEEE_802.16, p. 1.

3GPP Long Term Evolution—Wikipedia, the free encyclopedia, http://en.wikipedia.org/wiki/3GPP_Long_Term_Evolution, p. 1.

IEEE 802.22 WRAN WG Home Page, IEEE 802.22 Working Group on Wireless Regional Area Networks Enabling Rural Broadband Wireless Access Using Cognitive Radio Technology in TV Whitespaces, http://www.ieee802.org/22/, pp. 2.

Rocco Claudio Cannizzaro, Paolo Banelli, and Geert Leus, "Adaptive Channel Estimation for OFDM Systems with Doppler spread", IEEE Signal Processing Advances in Wireless Communications, Jul. 2006, pp. 5.

Steven M. Kay, "Fundamentals of Statistical Signal Processing—Estimation Theory", Prentice Hall Signal Processing Series, 1993, vol. 1, Chapter 8, pp. 219-288.

Steven M. Kay, "Fundamentals of Statistical Signal Processing—Estimation Theory", Prentice Hall Signal Processing Series, 1993, vol. 1, Chapter 12, pp. 379-418.

Karthik Muralidhar and D. Sreedhar, "Pilot Design for Vector State-Scalar Observation Kalman Channel Estimators in Doubly-Selective MIMO-OFDM Systems", IEEE Wireless Communications Letters, vol. 2, No. 2, Apr. 2013, 4 pages.

* cited by examiner

RECOVERY OF DATA FROM A MULTI CARRIER SIGNAL

PRIORITY CLAIM

The present application claims priority to U.S. Provisional Patent Application Nos. 61/105,704, filed Oct. 15, 2008; and 61/158,290, filed Mar. 6, 2009; both of which applications are incorporated herein by reference in their entireties.

RELATED APPLICATION DATA

The present application is related to commonly assigned and copending U.S. patent application Ser. No. 12/579,969, filed on Oct. 15, 2009, which application is incorporated herein by reference in its entirety.

SUMMARY

In an embodiment, a multi-carrier signal (e.g., an orthogonal-frequency-division-multiplexed (OFDM) signal) is received over a channel. Indicators of interference and the channel response at a carrier frequency of the signal are determined and compared. If the indicator of interference has a particular relationship to the indicator of the channel response, then a data value transmitted at the carrier frequency is recovered from a data value received at the carrier frequency according to a particular data-recovery algorithm.

Because the particular data-recovery algorithm may be faster than a conventional data-recovery algorithm, recovering one or more data values with the particular algorithm may increase the speed at which data is recovered from a multi-carrier signal as compared to using a conventional data-recovery algorithm exclusively.

DETAILED DESCRIPTION

Figure 1:
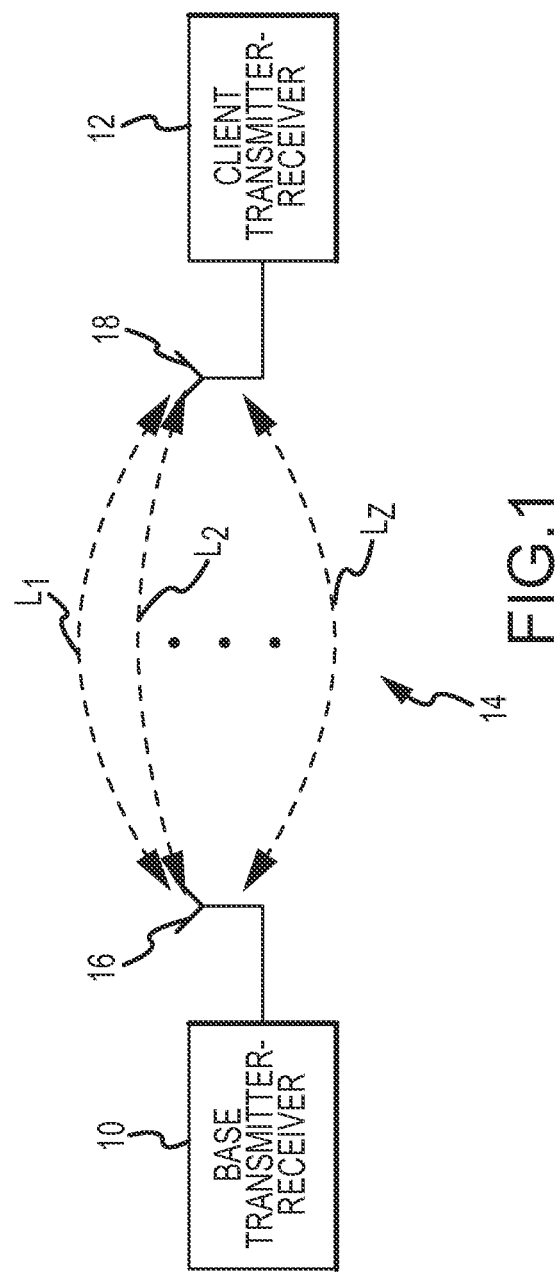
FIG. 1 is a block diagram of an embodiment of base and client orthogonal-frequency-division-multiplexing (OFDM) transmitter-receivers that are not moving significantly relative to one another while they are communicating with one another.

FIG. 1 is a block diagram of an embodiment of a base transmitter-receiver 10 and of a client transmitter-receiver 12, which communicates with the base transmitter-receiver over a wireless channel 14 via multicarrier signals (e.g., OFDM signals) while remaining substantially stationary relative to the base transmitter-receiver. For example, the base 10 may be a wireless router in a home or office, and the client 12 may be a computer that communicates with the base via OFDM signals that have N carriers. One or more antennas 16 are coupled to the base 10, and one or more antennas 18 are coupled to the client 12. Each antenna 16 may function as only a transmit antenna, as only a receive antenna, or both as a transmit and receive antenna; and each antenna 18 may function similarly. Furthermore, the channel 14 may include multiple paths $L_1$-$L_2$ over which the multicarrier signals travel. For example, a first path $L_1$ may be a straight-line path between the antennas 16 and 18, and a second path $L_2$ may be a multi-segmented path that is caused by signal reflections from one or more objects (not shown in FIG. 1) near the base 10, client 12, or channel 14.

Figure 2:
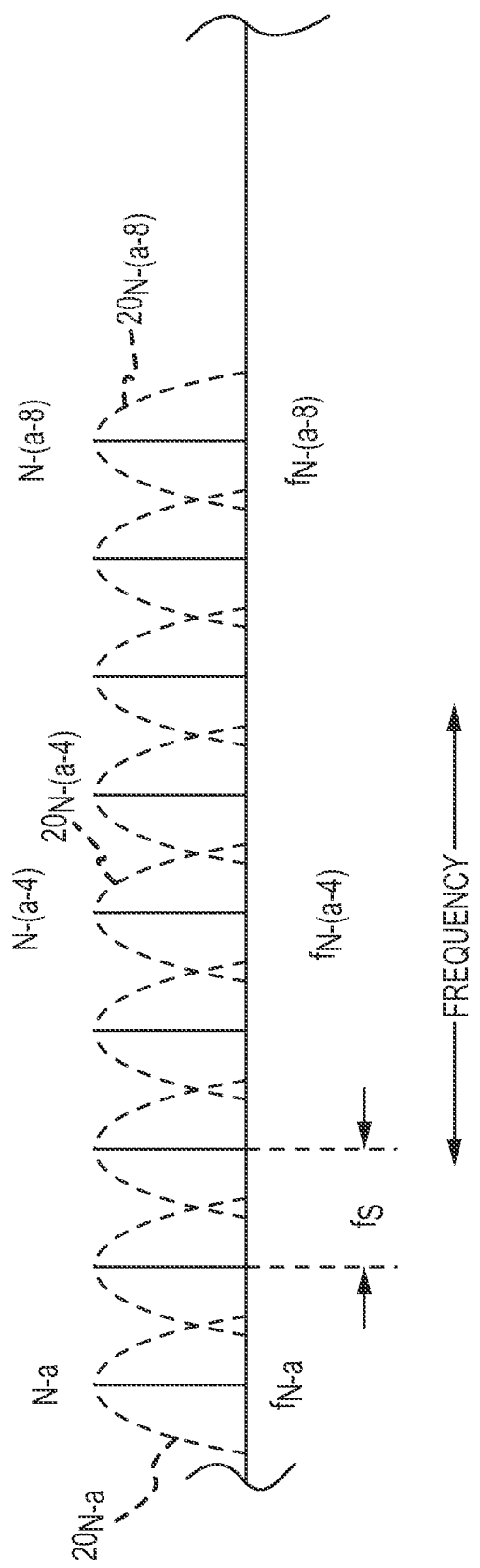
FIG. 2 is a plot of an embodiment of the frequencies of the carrier signals (solid lines) generated by the presently transmitting transmitter-receiver of FIG. 1, and of the frequency slots (dashed lines) that these carrier signals may respectively occupy at the presently receiving transmitter-receiver of FIG. 1.

FIG. 2 is a frequency plot of some of the N carriers (here, N-a to N-(a−8) in solid line and hereinafter called "subcarriers") of an embodiment of an OFDM signal that may be transmitted by the base 10 of FIG. 1 and received by the client 12, or vice versa. Although the base 10 is described as transmitting the OFDM signal in the example below, it is understood that this example would be similar if the client 12 were transmitting the OFDM signal.

The transmitter of the base 10 modulates each of at least some of the N subcarriers with a respective data value (hereinafter a data subsymbol) for a time period that may be called a symbol period—the transmitter may not use one or more of the subcarriers due to, for example, excessive interference at the frequencies of these subcarriers. Examples of such modulation schemes include binary phase-shift keying (BPSK), quadrature phase-shift keying (QPSK), and quadrature amplitude modulation (QAM); the latter two schemes providing data values that each have multiple bits.

The frequency spacing $f_s$ between adjacent ones of the subcarriers is conventionally selected to minimize inter-carrier interference (ICI), which is a phenomenon that occurs if energy from one subcarrier "spills over" to the frequency slot of another subcarrier at the receiver of the client 12. At the transmitter of the base 10, each of the active ones of the N subcarriers has a frequency $f_k$ represented by a respective one of the solid lines. But at the receiver of the client 12, the respective frequency $f_k$ of each subcarrier may be effectively shifted within a respective frequency slot 20 indicated by the dashed lines. For example, at the receiver of the client 12, the frequency $f_{N-a}$ of the subcarrier N-a may be shifted to another location within the frequency slot $20_{N-a}$. Causes for this frequency shifting may include, for example, the existence of multiple transmission paths L and channel conditions (e.g., humidity, temperature) that may effectively shift the respective phase and attenuate the respective amplitude of each modulated subcarrier.

To allow the receiver of the client 12 to recover the data subsymbols in the presence of the ICI, the transmitter of the base 10 transmits a training symbol—a "training symbol" is the combination of all the training subsymbols transmitted during a training-symbol period—shortly before transmitting a data symbol—a "data symbol" is the combination of all of the data subsymbols transmitted during a data-symbol period. That is, the transmitter of the base 10 transmits the training symbol during a first symbol period, and transmits the data symbol during a second, subsequent symbol period. Because the receiver of the client 12 "knows" what the transmitted training symbol is, it characterizes the channel 14 by comparing the received training symbol with the transmitted training symbol. For example, the receiver may characterize the channel 14 by conventionally generating an N×N matrix $\hat{H}$ of estimated complex coefficients that respectively represent the effective frequency response (e.g., the imparted amplitude attenuation and phase shift) of the channel at each of the subcarrier frequencies. As discussed in more detail below, the receiver may then use $\hat{H}$ to recover transmitted data symbols from respective received data symbols.

Figure 3:
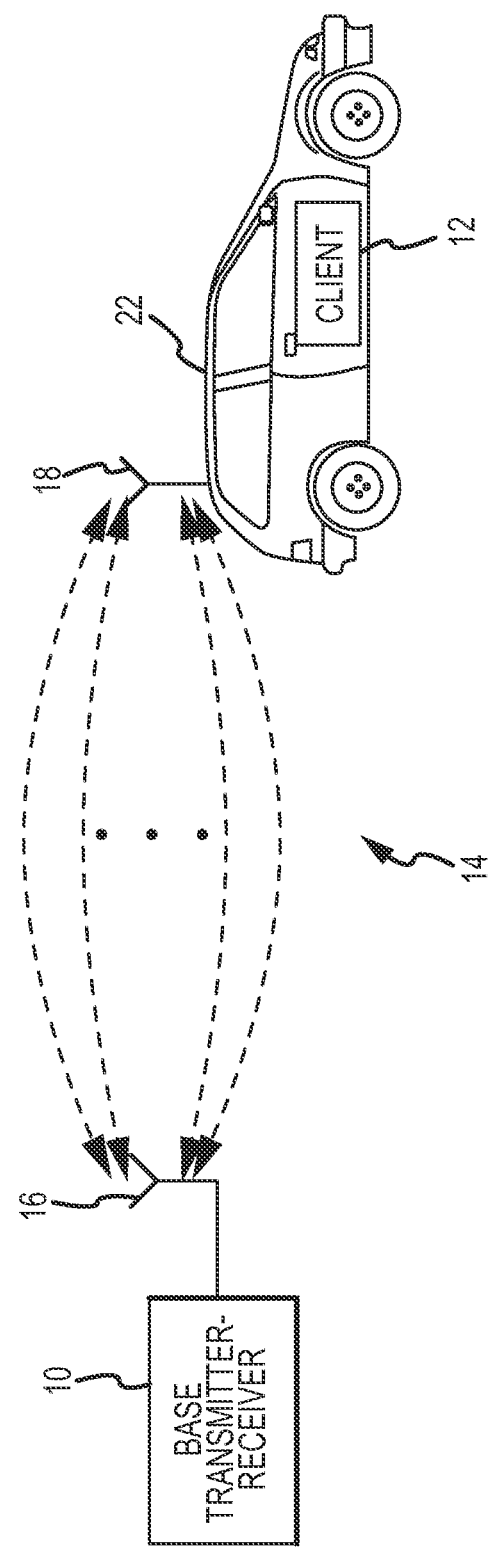
FIG. 3 is a block diagram of an embodiment of base and client OFDM transmitter-receivers that are moving relative to one another while they are communicating with one another.

FIG. 3 is a block diagram of an embodiment of the base transmitter-receiver 10 and of the client transmitter-receiver 12 of FIG. 1, but where the base and client are moving relative to one another at a non-zero velocity (the velocity may be time varying) while they are communicating with one another, and where like numbers refer to components common to FIGS. 1 and 3. For example, the base 10 may be a cell tower, and the client 12 may be an internet phone that is located within a moving automobile 22. The base 10 and the client 12 may communicate with each other according to one or more standards that specify OFDM technology for mobile communications. These standards include, for example, the DVB-H standard, the WLAN standard, and the YMAX standard. Furthermore, although only the client 12 is shown as moving, in other embodiments the base 10 may be moving and the client 12 may be stationary, or both the base and the client may be moving simultaneously.

Figure 4:
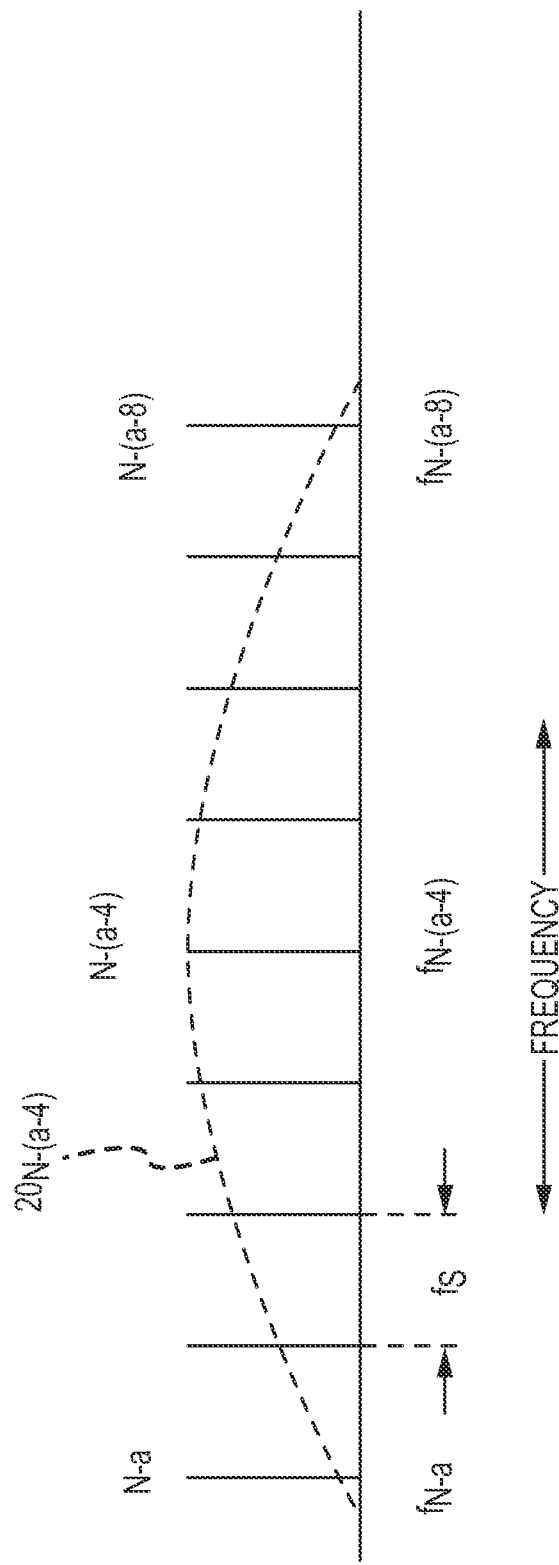
FIG. 4 is a plot of an embodiment of the frequencies of the carrier signals (solid lines) generated by the presently transmitting transmitter-receiver of FIG. 3, and of the frequency slot (dashed line) that the center one of these carrier signals may respectively occupy at the presently receiving transmitter-receiver of FIG. 3.

FIG. 4 is a frequency plot of some of the N subcarriers (here, N-a to N-(a−8) in solid line) of an embodiment of an OFDM signal that may be transmitted by the base 10 of FIG. 1 and received by the client 12, or vice versa. Although the base 10 is described as transmitting the OFDM signal, in the example below, it is understood that this example would be similar if the client 12 were transmitting the OFDM signal.

At the base 10, the OFDM signal may be similar to the OFDM signal of FIG. 2 in that the base modulates each of at least some of the N subcarriers with a respective data subsymbol, and each of the active ones of the N subcarriers has a frequency $f_k$ represented by a respective one of the solid lines.

But at the receiving client 12, the frequency $f_k$ of a subcarrier k may be shifted by one or more times $f_s$ as indicated by the frequency slot $20_{N(a-4)}$ of the subcarrier N-(a−4) (only one frequency slot shown in FIG. 3 for clarity) such that energy from a subcarrier k may spill over to one or more adjacent subcarriers on either side of the subcarrier k. For example, in the embodiment shown in by FIG. 4, energy from the subcarrier N-(a−4) may spill over to the frequencies $f_{N-a}$-$f_{N-(a-3)}$ and $f_{N-(a-5)}$-$f_{N-(a-8)}$ of the subcarriers N-a to N-(a−3) and N-(a−5) to N-(a−8), respectively.

The frequency shifts of the received OFDM subcarriers of FIG. 4 may be significantly greater than the frequency shifts of the received OFDM subcarriers of FIG. 2 because, in addition to the causes for this frequency shifting described above (e.g., the existence of multiple transmission paths L and channel conditions), the received OFDM subcarriers of FIG. 4 may experience respective Doppler shifts caused by the relative movement between the base 10 and the client 12.

According to the Doppler Effect, the frequency of a signal at a receiver is different from the frequency of the signal at a transmitter if the receiver and transmitter are moving relative to one another. If the receiver and transmitter are moving away from one another, then the frequency of the signal at the receiver is typically lower than the frequency of the signal at the transmitter. Conversely, if the receiver and transmitter are moving toward one another, then the frequency of the signal at the receiver is typically higher than the frequency of the signal at the transmitter. For example, a person (receiver) who is listening to the whistle of an approaching train (transmitter) may experience this phenomenon. While the train is moving toward the person, the person perceives the whistle as having a pitch that is higher than the pitch that one on the train would perceive the whistle as having. But after the train passes the person, and is thus moving away from him, the person perceives the whistle as having a pitch lower than the pitch that one on the train would perceive the whistle as having.

Consequently, the subcarrier frequencies of the OFDM signal of FIG. 4 as received by the client 12 of FIG. 3 may be influenced by the Doppler Effect in a similar manner.

A measure of the influence that the Doppler Effect has on a single transmitted tone (e.g., an unmodulated subcarrier signal) is the "Doppler Spread", which is the bandwidth that the tone may occupy at the receiver due to the Doppler Effect. For example, suppose the frequency of the tone is 1,000 Hz at the transmitter, but at the receiver, due to the non-zero velocity of the receiver and transmitter relative to one another, the received tone may have a frequency anywhere from 980 Hz to 1,020 Hz depending on the instantaneous velocity. Therefore, the Doppler Spread=1020 Hz−980 Hz=40 Hz. That is, the Doppler Spread is (40 Hz)/(1000 Hz)=4% of the frequency of the transmitted tone—although expressed here in Hz and as a percentage of the transmitted frequency, the Doppler Spread may be expressed in other quantities as described below.

For mobile OFDM devices, one may characterize the ICI caused by the Doppler Spread of a subcarrier in terms of the highest number of adjacent subcarriers with which the subcarrier may interfere. For example, the total Doppler induced ICI caused by the $50^{th}$ subcarrier is greater if energy from this subcarrier spills over to the $48^{th}$, $49^{th}$, $51^{st}$, and $52^{nd}$ subcarriers, and is less if energy from this subcarrier spills over to only the $49^{th}$ and $51^{st}$ subcarriers. In actuality, because the Doppler Spread of a subcarrier may cause the subcarrier to spill over energy into many or all of the other N subcarrier slots to some degree, one may set a subcarrier Doppler Spread interference threshold below which another subcarrier is deemed to be unaffected by the Doppler Spread of the subcarrier in question. Therefore, for mobile OFDM devices, the extent of Doppler induced ICI caused by a subcarrier k may be defined in terms of the number of adjacent subcarriers (above and below the subcarrier k in question) that may experience a level of ICI above the Doppler Spread interference threshold. Furthermore, a subcarrier k may experience a different Doppler Spread than other subcarriers.

Consequently, referring to FIGS. 3 and 4, the frequency slots 20 (only the frequency slot $20_{N-(a-4)}$ of the subcarrier N-(a−4) is shown for clarity) each represent the bandwidth that a respective subcarrier transmitted by the base 10 may occupy at the receiving client 12 due to all causes (e.g., the existence of multiple transmission paths L, channel conditions, and Doppler Spread). When the base 10 and client 12 are moving relative to one another, however, the greatest contributor to the frequency-slot bandwidth may be the Doppler Spread.

Still referring to FIGS. 3 and 4, because the Doppler Spread of an OFDM signal may vary relatively quickly with time, transmitting a training symbol separately from the data symbol may not allow the receiver of the client 12 to adequately estimate the matrix $\hat{H}$ of channel-response coefficients such that $\hat{H}$ will account for the Doppler Spread.

Consequently, mobile OFDM devices, such as the base 10, may combine training subsymbols and data subsymbols into a single OFDM symbol such that a receiving device, such as the client 12, may characterize the channel for the same time period during which the data symbols where transmitted. Because conventional techniques exist for combining the training and data subsymbols into a single OFDM symbol, such techniques are not further described.

Figure 5:
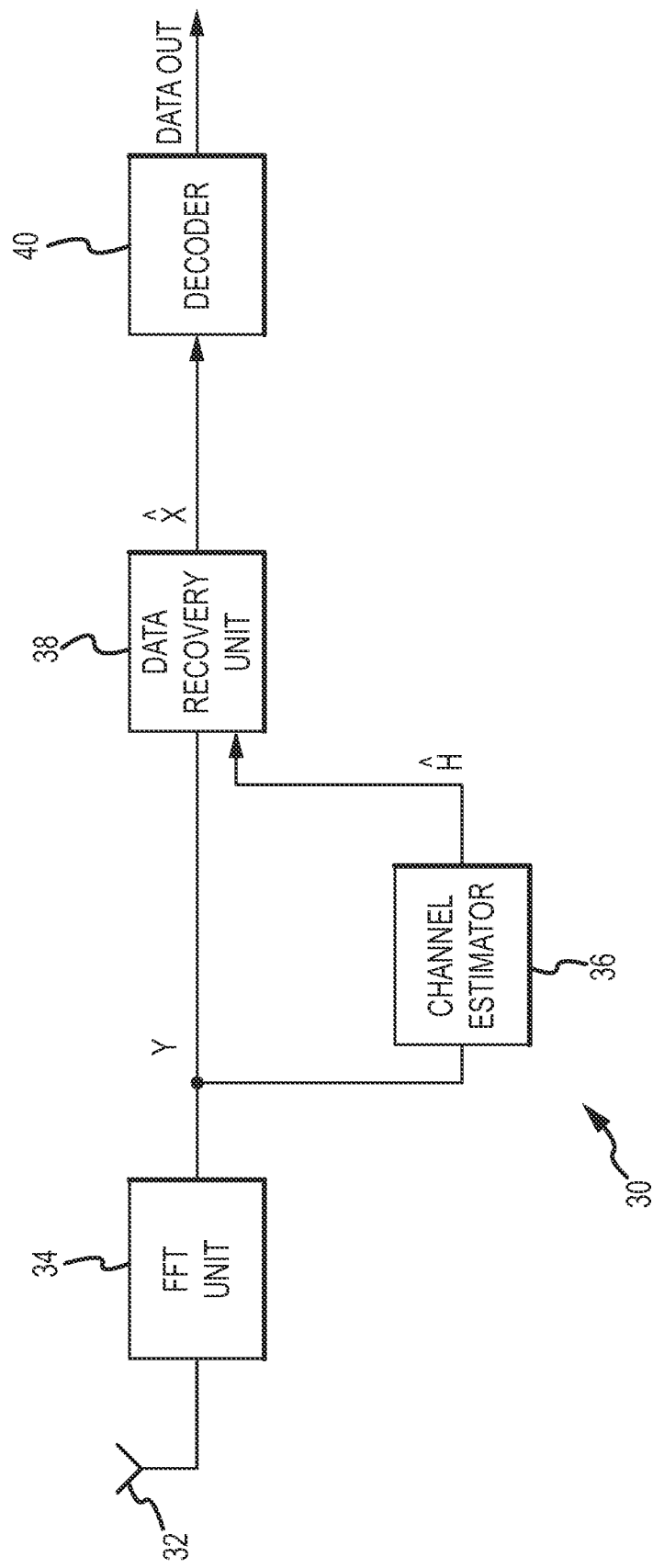
FIG. 5 is a block diagram of an embodiment of the receiver of one or both of the base and client transmitter-receivers of FIG. 3.

FIG. 5 is a block diagram of an embodiment of a receiver 30 for a mobile OFDM device such as the base 10 or client 12 of FIG. 3.

The receiver 30 includes a receive antenna 32, a Fast Fourier Transform (FFT) unit 34, a channel estimator 36, a data-recovery unit 38, and a decoder 40. The FFT unit 34, channel estimator 36, data-recovery unit 38, and decoder 40 may each be implemented in software, hardware, or a combination of software and hardware.

The receive antenna 32 may receive one or more OFDM symbols from a transmitter such as the base 10 of FIG. 3, where at least some of the subcarrier signals may experience Doppler Spread. The antenna 32 may also function to transmit OFDM symbols generated by a transmitter (not shown in FIG. 5) of the OFDM device that incorporates the receiver 30.

The FFT unit 34 conventionally converts a received OFDM symbol from a time-domain waveform into an N×1 vector y of complex frequency-domain coefficients (e.g., one complex coefficient for each subcarrier).

The channel estimator 36 estimates the response of the communication channel (e.g., the channel 14 of FIG. 3) from the y coefficients for the pilot subcarriers, which are the subcarriers that compose the training portion of the received symbol y. From these pilot coefficients, the estimator 36 generates an N×N matrix $\hat{H}$ of complex frequency coefficients that collectively approximate the effective frequency response of the communication channel—the effective frequency response may take into account the affect of, e.g., channel conditions such as temperature and humidity, the existence of multiple transmission paths, and the Doppler Spread, at each of the subcarrier frequencies $f_k$, but may not take into account channel noise. Because, as discussed above, the Doppler Spread may cause energy from one subcarrier to spill over into the frequency slot of another subcarrier at the receiver, the matrix $\hat{H}$ may not be a diagonal matrix—a matrix is diagonal if all of its elements are zero except for the elements that lie along the main diagonal of the matrix. Because conventional techniques for generating the matrix $\hat{H}$ exist, a detailed description of the operation of the channel estimator 36 is omitted.

The data-recovery unit 38 recovers the OFDM symbol as transmitted by generating an N×1 vector $\hat{x}$, which is an estimation of the transmitted OFDM symbol. That is, $\hat{x}$ includes complex coefficients (one for each subcarrier) that are estimates of the complex coefficients with which the transmitter modulated the transmitted subcarriers. The unit 38 may generally recover $\hat{x}$ according to the following equations:

$$y = \hat{H}\hat{x} + n \quad (1)$$

$$\hat{H}^{-1}(y-n) = \hat{H}^{-1}\hat{H}\hat{x} = \hat{x} \quad (2)$$

where n is an N×1 vector of additive-white-Gaussian-noise complex coefficients at each of the subcarriers. For example, all of the N coefficients of the vector n may be the same. Furthermore, because, as discussed above, some of the y coefficients are for pilot subcarriers that are used only for channel-estimation purposes, the elements of $\hat{H}$, $\hat{x}$, y, and n that correspond to the pilot subcarriers may be discarded prior to calculating $\hat{H}^{-1}$ and solving equation (2) so as to reduce the complexity and increase the speed of the calculation.

The data decoder 40 effectively uses the $\hat{x}$ coefficients that correspond to the data subcarriers of the OFDM symbol to demodulate the corresponding data subsymbols, and to thus recover the data represented by the subsymbols. For example, if the transmitter modulated a data subcarrier by mapping it to a respective QPSK constellation element, then the data decoder 40 QPSK demodulates the data subcarrier to recover the same constellation element, which represents the bits of data carried by the modulated data subcarrier.

Still referring to FIG. 5, although conventional data-recovery units exist, such a unit may require a relatively long processing time to obtain $\hat{x}$ by solving equation (2).

A significant portion of the processing time required by a conventional data-recovery unit may be due to the calculating of the inverted matrix $\hat{H}^{-1}$. For example, if the OFDM symbol includes $N = 2^{10} = 1024$ subcarriers, then a brute-force solution to equation (2) requires the conventional data-recovery unit to calculate the 1024×1024 inverse $\hat{H}^{-1}$ of the 1024×1024 channel-estimation matrix $\hat{H}$.

To reduce the time required to solve for $\hat{x}$, instead of calculating $\hat{H}^{-1}$, the data-recovery unit 38 may calculate only a respective portion of $\hat{H}^{-1}$ for each subcarrier. That is, to obtain each element of $\hat{x}$, the data-recovery unit 38 may calculate only a respective submatrix of $\hat{H}^{-1}$, and use this submatrix to calculate the element of $\hat{x}$ according to an equation that may be derived from equation (2).

But even though calculating only a respective portion of $\hat{H}^{-1}$ for each subcarrier may reduce the time required by the data-recovery unit 38 to solve for $\hat{x}$, the data-recovery unit may still consume a significant amount of processing time to solve for $\hat{x}$.

Figure 6:
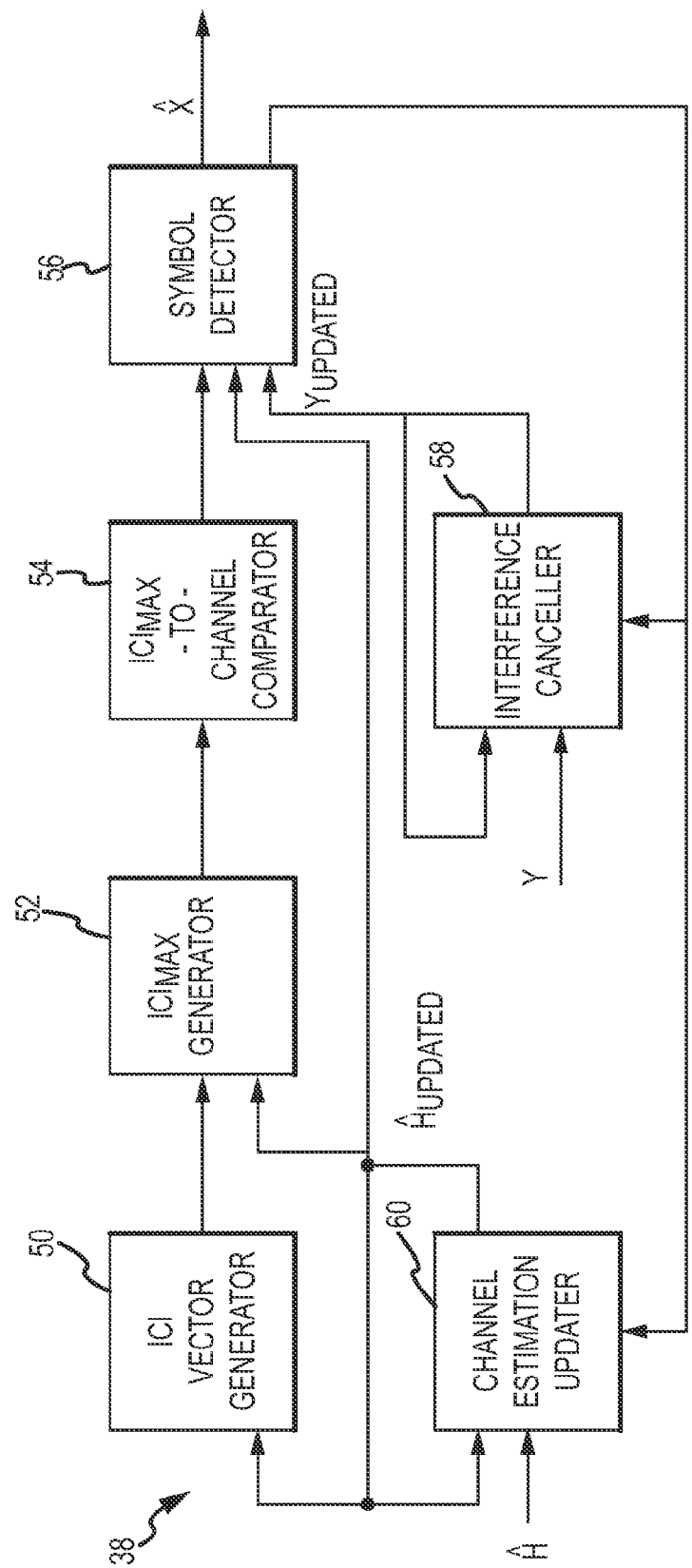
FIG. 6 is a block diagram of an embodiment of the data-recovery unit of the receiver of FIG. 5.

FIG. 6 is a block diagram of an embodiment of the data-recovery unit 38 of FIG. 5 that may solve for the estimation $\hat{x}$ of the transmitted OFDM symbol in a significantly shorter time as compared to other data-recovery units. The data-recovery unit 38 of FIG. 6 may shorten the time for determining $\hat{x}$ by determining at least some of the elements of $\hat{x}$ without performing an inversion of any portion of the matrix $\hat{H}$ or of any other matrix. This embodiment assumes that the transmitter has QPSK modulated the subcarriers k. Of course one may modify the data-recovery unit 38 to accommodate other modulation schemes.

The data-recovery unit 38 includes an ICI vector generator 50, an $ICI_{max}$ calculator 52, an ICI-to-channel-response comparator 54, a symbol detector 56, an interference canceller 58, and a channel-estimation updater 60.

The ICI vector generator 50 generates, for each subcarrier k, a 1×i interference vector $\Omega$ according to the following equation, where each element of $\Omega$ is an indicator of how much energy from an adjacent subcarrier k+|i| may spill over into the frequency $f_k$ of the subcarrier k due to the Doppler Spread:

$$\Omega_{k,i} = \hat{H}_{updated}^*(k,k)\hat{H}_{updated}(k,<k+i>) \text{ for } 1 \leq |i| \leq Q \quad (3)$$

where Q is the integer number of subcarriers adjacent to either side of the subcarrier k that may spill energy over into the frequency $f_k$ of the subcarrier k due to Doppler Spread, and < > indicates k+i mod N, where N is the number of carriers in the OFDM symbol and negative values of k+i are represented in two's complement form (e.g., where N=1024, <1>=1, and <−1>=1023). For example, if subcarriers k−4, k−3, k−2, k−1, k+1, k+2, k+3, and k+4 may spill energy over into the frequency $f_k$ of the subcarrier k, then Q=4. In an embodiment, Q may range from approximately 2 to approximately 6, and depends on the application. That is, one may program the ICI vector generator 50 with a Q value that is suitable for the application. For example, if the receiver 30 is installed in an OFDM device to be used in an automobile, the Q value may be lower than if the OFDM device is to be used in an airplane. Alternatively, the device may allow a user to enter information regarding the intended use (e.g., automobile, airplane), and use this information to set Q.

The $ICI_{max}$ calculator 52 calculates a value $I_{max}$ according to the following equation, where $I_{max}$ is an indicator of the estimated maximum total energy that may be collectively spilled over into the frequency $f_k$ of the subcarrier k by the adjacent subcarriers k+|i| for $1 \leq |i| \leq Q$:

$$I_{max} = \frac{1}{\sqrt{2}} \sum_{i=-Q}^{i=Q} (|\Re(\Omega k, i)| + |\Im(\Omega k, i)|) + \alpha\sigma(|\Re(\hat{H}_{updated}(k,k))| + |\Im(\hat{H}_{updated}(k,k))|) \quad (4)$$

for i≠0 (the subcarrier k cannot spill over energy into itself) where $\sigma^2$ is the variance of each complex sample of the channel background noise, each of these noise samples corresponding to a respective one of the N samples of the time-domain OFDM symbol that the FFT unit 34 takes, and $\alpha$ is selected such that for m % of the noise samples, it is estimated that the real part of the noise sample is less than $\alpha\sigma$. $\alpha$ and m are selected according to the following equation:

$$erf(\alpha/\sqrt{2})=m \quad (5)$$

where erf( ) is a probability error function described in Proakis, *Digital Communications*, McGraw Hill (1995), which is incorporated by reference. For example, where one selects m=92%, then $\alpha=\sqrt{3}$ satisfies equation (5). As can be seen from equation (4), $I_{max}$ depends on both the spillage into $f_k$ from neighboring subcarriers and on the channel noise. However, the effect of subcarrier spillage on the interference is more predominant than channel noise. One may select a using even lower values of m, for example m=50%. However, to be on the safe side (i.e., to minimize the number of occasions when equation (6) below is true when it should be false) one may choose a relatively high value of m, for example m=92%. Furthermore, because in an embodiment equation (4) is for a QPSK constellation, a is multiplied by $1/\sqrt{2}$ in equation (5). For other constellations (e.g., BPSK, QAM), equation (4) and the multiplier of equation (5) may change accordingly.

The ICI-to-channel-response comparator 54 calculates $|H(k,k)|^2$, which is an indicator of the channel response at the frequency $f_k$ of the subcarrier k, and calculates $\sqrt{2GI_{max}}$, which is an indicator of the maximum total energy that may spill over into $f_k$ due to the Doppler Spread, and compares these values according to the following equation:

$$|\hat{H}_{updated}(k,k)|^2 > \sqrt{2GI_{max}} \quad (6)$$

where G is a real value that may range from approximately 1.0→1.5; for example, G may equal 1.2 or 1.3. Where G is greater than 1.0, it may provide a tolerance to reduce the chance that an error in $I_{max}$ causes equation (6) to be true when, but for the error, it should be false. If equation (6) is true, then it indicates that the Doppler induced spill-over energy into the frequency $f_k$ of the subcarrier k is low enough that the symbol detector 56 may use a reduced-complexity algorithm to estimate the element k of the estimated transmitted symbol $\hat{x}$ as described below.

The symbol detector 56 may estimate the subsymbol $\hat{x}(k)$ (the subsymbol carried by the subcarrier k) according to one of at least two algorithms, depending on whether equation (6) is true or false. If equation (6) is true, then the detector 56 calculates $\hat{x}(k)$ according to the following equation, which represents a "hard decision":

$$\hat{x}(k)=\hat{H}_{updated}^*(k,k)\hat{y}_{updated}(k) \quad (7)$$

Because the Doppler induced spillover energy is small enough to render equation (6) true, equation (7) may be used to obtain $\hat{x}(k)$ instead of a more complicated equation that may include an inverse of $\hat{H}_{updated}$ or a portion thereof. In an embodiment, the probability that equation (7) will yield an incorrect value for $\hat{x}(k)$ (assuming equation (6) is true) is relatively small, for example, $1\times 10^{-4}$ or less. If equation (6) is false, then the detector 56 may calculate $\hat{x}(k)$ according to a conventional algorithm that may determine the inverse of the channel-response matrix $\hat{H}_{updated}$ or a portion thereof. But even if the symbol detector 56 determines only one or a few elements of $\hat{x}$ according to equation (7), this may still save processing time as compared to solving for every element of $\hat{x}$ with an inverse-matrix calculating algorithm, because none of equations (3)-(7) require taking an inverse of a matrix such as the estimated channel-response matrix $\hat{H}_{updated}$. And saving processor time may also save power.

If the symbol detector 56 calculates $\hat{x}(k)$ according to equation (7), then the interference canceller 58 updates the received-symbol vector y according to one of the following equations:

$$y_{updated}=y-\hat{H}(:,k)\hat{x}(k) \text{ for the initial update} \quad (8)$$

$$y_{updated}=y_{updated}-\hat{H}_{updated}(:,k)\hat{x}(k) \text{ for subsequent updates} \quad (9)$$

where the ":" operator indicates all rows, such that $\hat{H}(:,k)$ indicates the $k^{th}$ column of $\hat{H}$. Equations (8) and (9) effectively remove from the other subcarriers of the received symbol y substantially all energy that may have spilled over from the subcarrier k of the subsymbol just detected by the symbol detector 56 using equation (7). Because the updated vector $y_{updated}$ is the vector that the detector 56 uses to determine subsequent subsymbols of $\hat{x}$ (whether or not by using equation (7)), this interference cancellation may reduce the complexity, and thus the processing time, needed to recover the subsequent subsymbols. This interference cancellation may also increase the number of subsymbols of $\hat{x}$ for which equation (6) is true, and thus may increase the number of subsymbols that may be recovered using the reduced-complexity equation (7).

After the interference canceller 58 updates $y_{updated}$, the channel-estimation updater 60 updates the channel-estimation matrix $\hat{H}$ according to the following equations:

$$\hat{H}_{updated}=\hat{H}(:,k)=0_{N\times 1} \text{ for the initial update} \quad (10)$$

$$\hat{H}_{updated}(:,k)=0_{N\times 1} \text{ for subsequent updates} \quad (11)$$

These equations zero the column k of $\hat{H}_{updated}$, which is the column corresponding to the subcarrier of the just-detected subsymbol $\hat{x}(k)$. Therefore, equations (10) and (11) remove from $\hat{H}_{updated}$ substantially all of the influence that the subcarrier k may have on the other subcarriers due to Doppler Spread.

Figure 7:
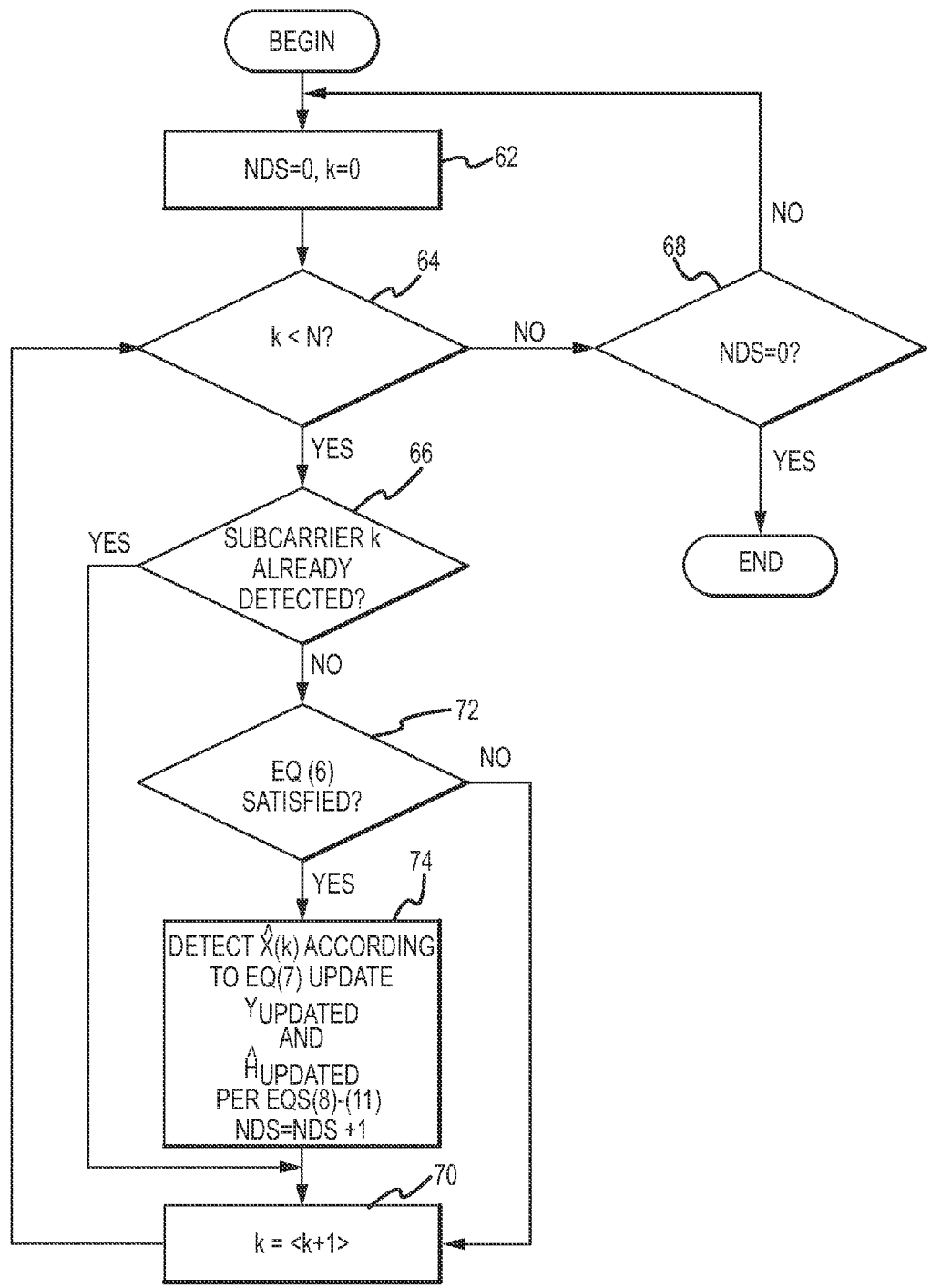
FIG. 7 is a flow chart of an embodiment of the operation of the data-recovery unit of FIG. 6.

FIG. 7 is a flow chart of an embodiment of the operation of the data-recovery unit 38 of FIG. 6.

Referring to FIGS. 6-7, an embodiment of the operation of the data-recovery unit 38 is described.

Referring to block 62, the data-recovery unit 38 initializes count values NDS and k to zero, where NDS represents the number of subsymbols x̂(k) detected by the symbol detector 56 according to equation (7), and k is the subcarrier index.

Then, referring to block 64, the unit 38 compares k to N, which is the total number of subcarriers in the received symbol y. If k<N, then the unit 38 proceeds to block 66. Otherwise, the unit 38 proceeds to block 68, which is described further below.

Next, referring to block 66, if k<N, then the unit 38 determines whether the subsymbol x̂(k) at the subcarrier k has already been detected. If so, then the unit 38 proceeds to block 70 and increments k by 1. If not, the unit proceeds to block 72.

Then, referring to block 72, if the subsymbol x̂(k) at the subcarrier k has not already been detected, the unit 38 calculates equations (3)-(6) as discussed above, and, determines whether equation (6) is true. If equation (6) is not true, the unit 38 proceeds to block 70 and increments k by 1. But if equation (6) is true, then the unit 38 proceeds to block 74.

Next, referring to block 74, if equation (6) is true, then the unit 38 solves for x̂(k) according to equation (7) as described above, updates $y_{updated}$ and $\hat{H}_{updated}$ according to equations (8)-(11) as described above, and increments NDS by 1 to indicate that subsymbol x̂(k) has been detected according to equation (7).

Then, referring to block 70, the unit 38 increments k by 1 and returns to block 64.

The data-recovery unit 38 repeats the above sequence until k=N.

When k=N, the unit 38 proceeds to block 68 and compares NDS to 0.

If NDS does not equal zero, then the unit 38 proceeds to block 62 and repeats the above sequence. Because NDS does not equal 0, the unit 38 detected at least one subsymbol x̂(k) according to equation (7), and updated $y_{updated}$ and $\hat{H}_{updated}$ according to equations (8)-(11). Because updating $y_{updated}$ and $\hat{H}_{updated}$ may cause equation (6) to be true for a subcarrier k for which equation (6) was not previously true, repeating the above-described sequence until NDS remains at zero may allow the unit 38 to detect more subsymbols x̂(k) according to equation (7), and thus may further reduce the time that the unit 38 consumes to detect the estimated transmitted symbol x̂.

Next, referring to block 68, when NDS=0, the above sequence ends, and the unit 38 detects any remaining subsymbols x̂(k) using another algorithm, e.g., an algorithm that calculates the inverse of Ĥ or portions thereof.

Still referring to FIGS. 6-7, alternate embodiments are contemplated. For example, the data-recovery unit 38 may perform the steps in FIG. 7 in an order that is different than that described, may omit some steps, or may add other steps.

Figure 8:
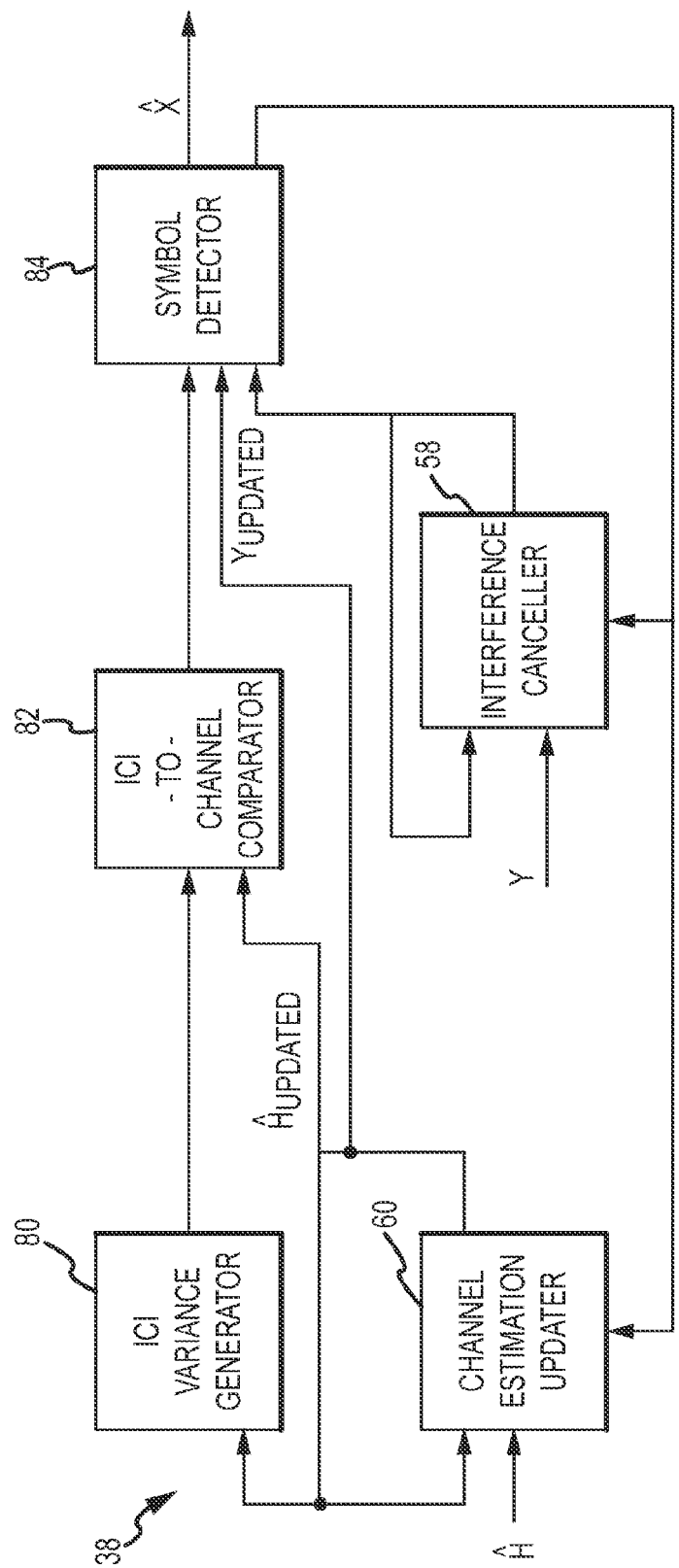
FIG. 8 is a block diagram of another embodiment of the data-recovery unit of the receiver of FIG. 5.

FIG. 8 is a block diagram of another embodiment of the data-recovery unit 38 of FIG. 5 that may solve for the estimation x̂ of the transmitted OFDM symbol in a significantly shorter time as compared to other data-recovery units, and where like numbers reference components common to FIGS. 6 and 8. Like the data-recovery unit 38 of FIG. 6, the data-recovery unit 38 of FIG. 8 may shorten the time for determining x̂ by determining at least some of the elements of x̂ without performing an inversion of any portion of the matrix Ĥ or of any other matrix. And, as discussed above in conjunction with FIG. 6, this embodiment assumes that the transmitter has QPSK modulated the subcarriers k. Of course one may modify the data-recovery unit 38 to accommodate other modulation schemes.

The data-recovery unit 38 includes an ICI variance generator 80, an ICI-to-channel-response comparator 82, a symbol detector 84, and the interference canceller 58 and the channel-estimation updater 60 described above in conjunction of FIG. 6.

The variance generator 80 generates, for each subcarrier k, a value $\bar{\rho}^2$ according to one of the following equations, where $\bar{\sigma}^2$ is the variance of the energy that may spill over into the subcarrier k from adjacent subcarriers to the left (lower-frequency subcarriers) or to the right (higher-frequency subcarriers) of the subcarrier k due to Doppler Spread:

$$\bar{\sigma}^2 = \qquad (12)$$
$$|\hat{H}_{updated}(k,k)|^2 \left(\sum_{i=1}^{i=Q} |\hat{H}_{updated}(k, \langle k+i \rangle)|^2 + \sigma^2\right) \text{ if } LNC \text{ is satisfied}$$

$$\bar{\sigma}^2 = \qquad (13)$$
$$|\hat{H}_{updated}(k,k)|^2 \left(\sum_{i=1}^{i=Q} |\hat{H}_{updated}(k, \langle k-i \rangle)|^2 + \sigma^2\right) \text{ if } RNC \text{ is satisfied}$$

where Q is the integer number of subcarriers adjacent to either side of the subcarrier k that may spill energy over into the frequency $f_k$ of the subcarrier k due to Doppler Spread, $\sigma^2$ is the variance of each complex sample of the channel background noise, LNC is "left neighbor condition", and RNC is "right neighbor condition". LNC is satisfied if the subsymbols carried by the b subcarriers to the immediate left of the subcarrier k have already been detected; similarly, RNC is satisfied if the subsymbols carried by the b subcarriers to the immediate right of the subcarrier k have already been detected. One may program the variance generator 80 with an integer value of b that is suitable for the application, and the application information (e.g., that the mobile OFDM device incorporating the data-recovery unit 38 is being used in an automobile or on an airplane) may be provided by the device user in a manner similar to that described above in conjunction with FIG. 6. For example, b may have a value in the range of approximately 1→3, and Q may range from approximately 2→6 and may also depend on the application as described above in conjunction with FIG. 6.

The ICI-to-channel-response comparator 82 calculates $$\frac{|\hat{H}_{updated}(k,k)|^2}{\sqrt{2}},$$

which is an indicator of the channel response at the frequency $f_k$ of the subcarrier k, and $t\bar{\sigma}^2$, which is an indicator of the level of energy that may spill over into $f_k$ from adjacent subcarriers due to the Doppler Spread, and compares these values according to the following equation:

$$\frac{|\hat{H}_{updated}(k,k)|^2}{\sqrt{2}} < t\bar{\sigma} \qquad (14)$$

t is calculated according to the following equation:

$$erfc(t) = ER/2 \qquad (15)$$

where erf( ) is a probability error function provided in Proakis, Digital Communications, McGraw Hill (1995), which is incorporated by reference, and ER is the probability that the subsymbol $\hat{x}(k)$ to be calculated by the symbol detector 84 according to equation (16) below will be erroneous. ER depends on the acceptable error rate for the application. Some applications may only tolerate lower error rates while some may tolerate higher error rates. Therefore, the designer of the data-recovery unit 38 may select a value for ER that is suitable for the application. In an embodiment, ER may approximately equal $1 \times 10^{-4}$. In another embodiment, ER may be greater than the probability of error when detecting $\hat{x}(k)$ according to equation (7) as described above in conjunction with FIGS. 6-7, and as discussed below in conjunction with FIG. 10. If equation (14) is true, then it indicates that the total energy that may spill over into the frequency $f_k$ of the subcarrier k is low enough that the symbol detector 84 may use a higher-speed algorithm to determine the estimated subsymbol $\hat{x}(k)$ as described below.

The symbol detector 84 detects the subsymbol $\hat{x}(k)$ (the subsymbol carried by the subcarrier k) according to one of at least two algorithms, depending on whether equation (14) is true or false. If equation (14) is true, then the detector 84 determines $\hat{x}(k)$ according to the following equation, which is based on a linear minimum mean squared error (LMMSE):

$$\hat{x}(k) = \frac{\hat{H}^*_{updated}(k,k) y_{updated}(k)}{|\hat{H}_{updated}(k,k)|^2 + \overline{\sigma}^2} \quad (16)$$

Because the Doppler Spread spillover energy is small enough to render equation (14) true, equation (16) may be used to obtain $\hat{x}(k)$ instead of a more complicated equation that may include an inverse of $\hat{H}_{updated}$ or a portion thereof. As discussed above, the probability that equation (16) will yield an incorrect value for $\hat{x}(k)$ is approximately ER. If equation (14) is false, then the symbol detector 84 may calculate $\hat{x}(k)$ according to another algorithm that may determine the inverse of the channel-response matrix $\hat{H}_{updated}$ or a portion thereof. But even if the symbol detector 84 determines only one or a few elements of $\hat{x}$ according to equation (16), this may still save processing time as compared to solving for every element of with an inverse-matrix-calculation algorithm, because none of equations (12)-(14) and (16) involves taking an inverse of a matrix such as the estimated channel-response matrix $\hat{H}_{updated}$.

If the symbol detector 84 calculates $\hat{x}(k)$ according to equation (16), then the interference canceller 58 updates the received-symbol vector $y_{updated}$ according to equation (8) or (9) as discussed above in conjunction with FIGS. 6-7.

After the interference canceller 58 updates $y_{updated}$, the channel-estimation updater 60 updates the channel-estimation matrix $\hat{H}_{updated}$ according to equation (10) or (11) as discussed above in conjunction with FIGS. 6-7.

Still referring to FIG. 8, if both the LNC and RNC are satisfied, then the unit 38 may determine $\hat{x}(k)$ according to equation (7) above, may determine $\hat{x}(k)$ according to a matrix-inversion-calculation algorithm, or may determine $\hat{x}(k)$ according to equation (16) after determining $\overline{\sigma}^2$ according to either equation (12) or equation (13).

Figure 9:
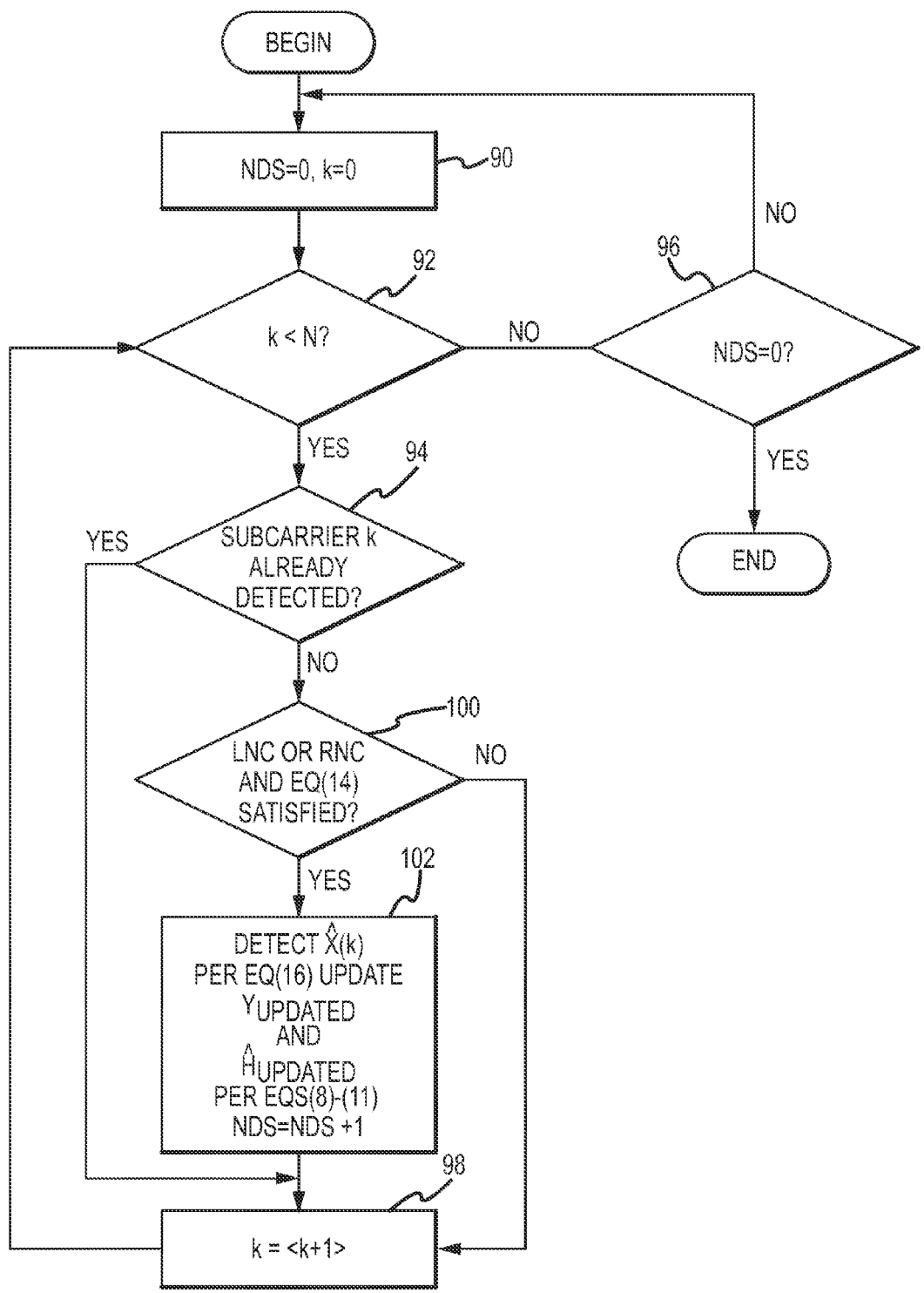
FIG. 9 is a flow chart of an embodiment of the operation of the data-recovery unit of FIG. 8.

FIG. 9 is a flow chart of an embodiment of the operation of the data-recovery unit 38 of FIG. 8.

Referring to FIGS. 8-9, an embodiment of the operation of the data-recovery unit 38 of FIG. 8 is described.

Referring to block 90, the data-recovery unit 38 initializes count values NDS and k to zero, where NDS represents the number of subsymbols $\hat{x}(k)$ detected by the symbol detector 84 according to equation (16), and k is the subcarrier index.

Then, referring to block 92, the unit 38 compares k to N, which is the total number of subcarriers in the received symbol y. If k<N, then the unit 38 proceeds to block 94. If not, then the unit 38 proceeds to block 96, which is described further below.

Next, referring to block 94, if k<N, then the unit 38 determines whether the subsymbol $\hat{x}(k)$ at the subcarrier k has already been detected. If so, then the unit 38 proceeds to block 98 and increments k by 1. If not, the unit proceeds to block 100.

Then, referring to block 100, if the subsymbol $\hat{x}(k)$ at the subcarrier k has not already been detected, then the unit 38 determines whether the LNC or the RNC is satisfied. If neither the LNC nor the RNC is satisfied, then the unit 38 proceeds to block 98 and increments k by 1. If either the LNC or the RNC is satisfied, then the unit 38 calculates equation (12) or (13) (depending on whether the LNC or the RNC is satisfied) and equation (14) as discussed above in conjunction with FIG. 8, and determines whether equation (14) is true. If equation (14) is not true, then the unit 38 proceeds to block 98 and increments k by 1. But if equation (14) is true, then the unit 38 proceeds to block 102. Because at first no data subsymbols $\hat{x}(k)$ have been detected, then neither the LNC nor the RNC is satisfied. Consequently, before starting at the block 90, the data-recovery unit 38 may detect a number of data subsymbols $\hat{x}(k)$ using another algorithm, such as the algorithm described above in conjunction with FIGS. 6 and 7, or an algorithm that may calculate the inverse of or portions thereof. Alternatively, as discussed above, the pilot symbols are known. Therefore, the unit 38 may perform interference-cancellation due to one or more of these known pilot symbols so that for the data symbols adjacent to the pilot symbols, either the RNC or the LNC is satisfied.

Next, referring to block 102, if equation (14) is true, then the unit 38 solves for $\hat{x}(k)$ according to equation (16) as described above, updates $y_{updated}$ and $\hat{H}_{updated}$ according to equations (8)-(11) as described above, and increments NDS by 1 to indicate that a subsymbol $\hat{x}(k)$ has been detected according to equation (16).

Then, referring to block 98, the unit 38 increments k by 1, and returns to block 92.

The data-recovery unit 38 of FIG. 8 repeats the above sequence until k=N.

When k=N, the unit 38 proceeds to block 96 and compares NDS to 0.

If NDS does not equal zero, then the unit 38 proceeds to block 90 and repeats the above sequence. Because NDS does not equal 0, the unit 38 detected at least one subsymbol $\hat{x}(k)$ according to equation (16), and updated $y_{updated}$ and $\hat{H}_{updated}$ according to equations (8)-(11). Because updating $y_{updated}$ and $\hat{H}_{updated}$ may cause equation (14) to be true for a subcarrier k for which equation (14) was not previously true, repeating the above-described sequence until NDS remains at zero may allow the unit 38 to detect more subsymbols $\hat{x}(k)$ according to equation (16), and thus may further reduce the time that the unit 38 consumes to detect the estimated transmitted symbol $\hat{x}$.

Next, referring to block 96, when NDS=0, the above sequence ends, and the unit 38 detects any remaining subsymbols $\hat{x}(k)$ using another algorithm, e.g., an algorithm that calculates the inverse of $\hat{H}$ or portions thereof.

Still referring to FIGS. 8-9, alternate embodiments are contemplated. For example, the data-recovery unit 38 may perform the steps in FIG. 9 in an order that is different than that described, may omit some steps, or may add other steps.

Figure 10:
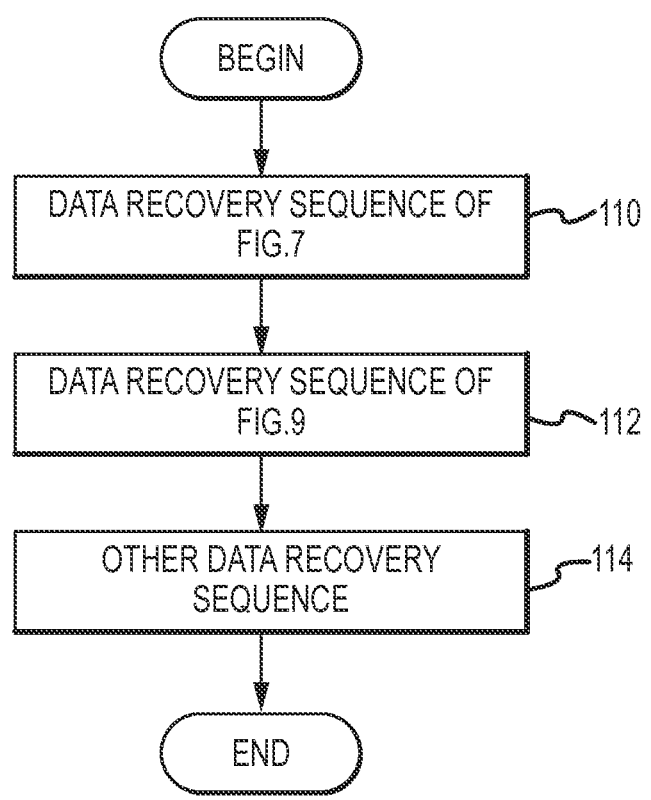
FIG. 10 is a flow chart of an embodiment of the operation of the data-recovery unit receiver of FIG. 5, where the data-recovery unit that has the functionality of both the data-recovery units of FIGS. 6 and 8.

FIG. 10 is a flow chart of an embodiment of the operation of the data-recovery unit 38 of FIG. 5, where this embodiment of the unit 38 includes the functionality of both embodiments of the unit 38 described above in conjunction with FIGS. 6-9. That is, this embodiment of the data-recovery unit 38 is operable to execute the sequences of FIGS. 7 and 9.

Referring to block 110, the data-recovery unit 38 detects as many of the subsymbols $\hat{x}(k)$ as possible using equation (7) per the sequence of FIG. 7. If the unit 38 detects all of the data subsymbols $\hat{x}(k)$ in this manner, then the data subsymbol detection sequence ends. If not, the sequence proceeds to block 112.

Next, referring to block 112, the unit 38 detects as many of the remaining subsymbols $\hat{x}(k)$ as possible using equation (16) per the sequence of FIG. 9. If the unit 38 detects all of the remaining data subsymbols $\hat{x}(k)$ in this manner, then the data subsymbol detection sequence ends. If not, the sequence proceeds to block 114.

Then, referring to block 114, the unit 38 detects any remaining data subsymbols $\hat{x}(k)$ per another algorithm, e.g., an algorithm that may calculate the inverse of $\hat{H}$ or portions thereof.

Figure 11:
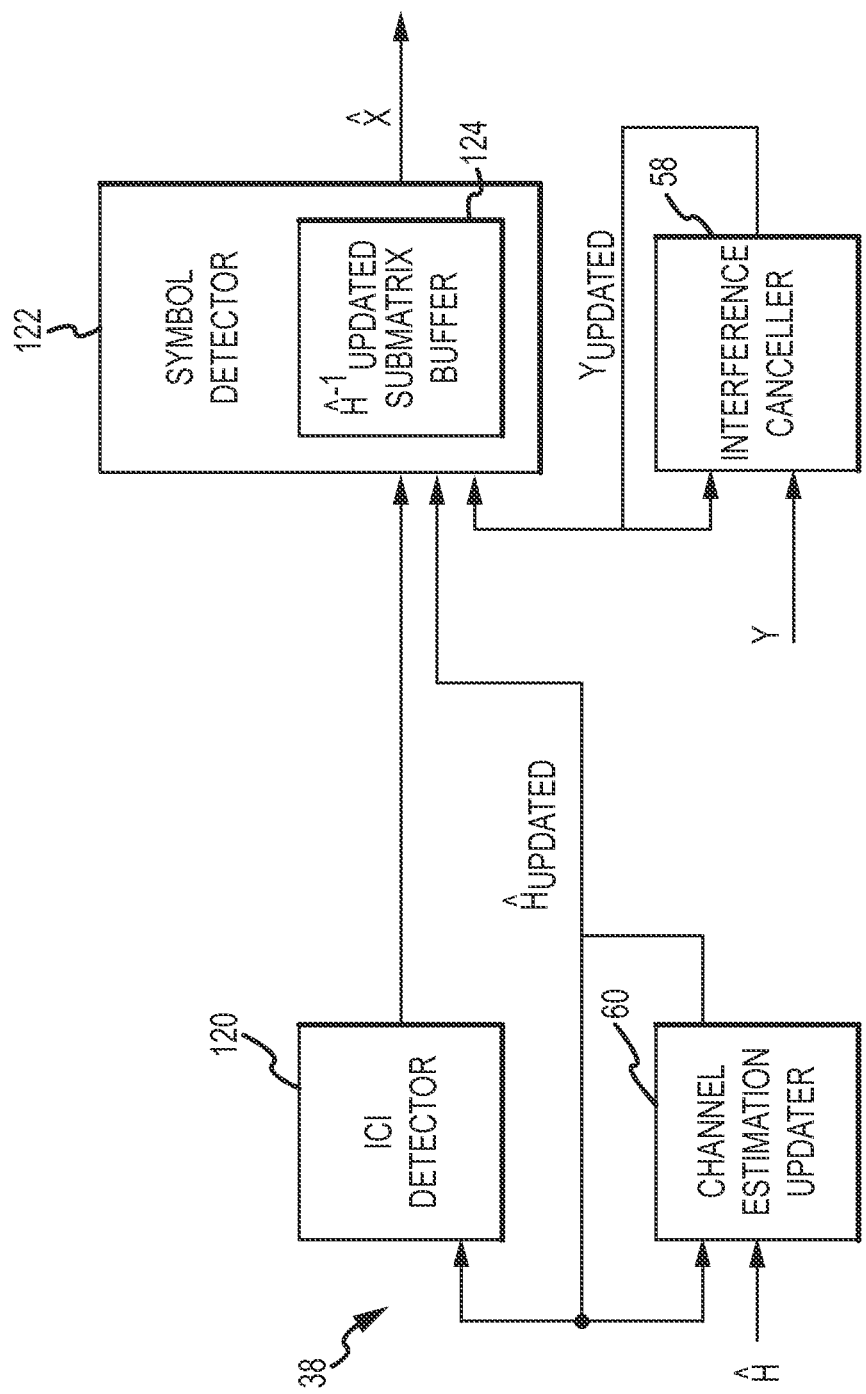
FIG. 11 is a block diagram of another embodiment of the data-recovery unit of the receiver of FIG. 5.

FIG. 11 is a block diagram of another embodiment of the data-recovery unit 38 of FIG. 5 that may solve for the estimation $\hat{x}$ of the transmitted OFDM symbol in a significantly shorter time as compared to other data-recovery units, and where like numbers reference components common to FIGS. 6, 8, and 11. Unlike the data-recovery units 38 of FIGS. 6 and 8, however, the data-recovery unit 38 of FIG. 11 may shorten the time for determining $\hat{x}$ by more efficiently calculating an inversion of the matrix $\hat{H}$ or $\hat{H}_{updated}$ or of a portion thereof. Furthermore, the data-recovery sequence described below may be used as the other data-recovery sequence 114 of FIG. 10.

The data-recovery unit 38 of FIG. 11 includes an ICI detector 120, symbol detector 122, and the interference canceller 58 and the channel-estimation updater 60 of FIGS. 6 and 8.

The ICI detector 120 determines a signal-to-ICI ratio (SIR) for each subcarrier k of the received OFDM symbol, and orders the subcarriers from highest SIR to lowest SIR. A technique for determining the SIR for a subcarrier k is disclosed in *Low-Complexity ICI Cancellation in Frequency Domain for OFDM Systems in Time-Varying Multipath Channels*, Wang et al. (2006) IEICE Trans. Commun.; E89-B:1020, which is incorporated by reference.

The symbol detector 122 detects the subsymbols $\hat{x}(k)$ in the order provided by the ICI detector 120, that is, from the subsymbol $\hat{x}(k)$ modulating the subcarrier k having the highest SIR to the subsymbol $\hat{x}(k)$ modulating the subcarrier k having the lowest SIR. By detecting the subsymbol associated with the highest SIR first, the detector 122 detects the subsymbol having the highest probability of being correctly detected, and, then, via, e.g., interference cancellation, may use one or more of the detected subsymbols to improve the accuracy with which it will detect subsequent subsymbols.

Furthermore, the symbol detector 122 detects each subsymbol $\hat{x}(k)$ by calculating a respective inverse $\hat{H}^{-1}{}_{updated}$ of a submatrix of $\hat{H}_{updated}$.

Because the inverse submatrix $\hat{H}^{-1}{}_{updated}$ calculated for one subcarrier k may be conventionally used to speed the calculation of an inverse submatrix $\hat{H}^{-1}{}_{updated}$ for another subcarrier k, the symbol detector 122 includes a submatrix buffer 124 for storing calculated inverse submatrices $\hat{H}^{-1}{}_{updated}$ for possible future use. In an embodiment, an inverse submatrix $\hat{H}^{-1}{}_{updated}$ calculated for a subcarrier k may be used to speed the calculation of inverse submatrices $\hat{H}^{-1}{}_{updated}$ for $|v|$ adjacent subcarriers, where v depends on, e.g., the dimensions of the inverse submatrix $\hat{H}^{-1}{}_{updated}$ calculated for the subcarrier k. In an embodiment, v is an integer that ranges from approximately 1→10, although it may be greater than 10. After all of the subsymbols within ±v of the detected subsymbol $\hat{x}(k)$ have also been detected, the symbol detector 122 may delete from the buffer 124 the inverse submatrix $\hat{H}^{-1}{}_{updated}$ calculated for the subcarrier k. Deleting inverse submatrices $\hat{H}^{-1}{}_{updated}$ in this manner may allow one to reduce the size of the buffer 124 as compared to a buffer that stores all inverse submatrices until the entire estimated symbol $\hat{x}$ is detected.

Still referring to FIG. 11, an embodiment of the operation of the data-recover unit 38 of FIG. 11 is described. In this embodiment, no subsymbols $\hat{x}(k)$ have been detected using another technique before the commencement of the below sequence.

Initially, before any subsymbols $\hat{x}(k)$ have been detected, the ICI detector 120 receives $\hat{H}_{updated}=\hat{H}$ from the channel-estimation updater 60 (or receives H directly from the channel estimator 36 of FIG. 5), determines from this channel-estimation matrix the respective SIR for each subcarrier k, and indicates the order of the subcarriers from highest SIR to lowest SIR.

Next, the symbol detector 122 generates an inverse submatrix $\hat{H}^{-1}{}_{updated}$ corresponding to the subsymbol carried by the subcarrier k having the highest SIR, and, using this inverse submatrix and $y_{updated}=y$, calculates the estimation $\hat{x}(k)$ of the transmitted subsymbol on the subcarrier k. The symbol detector 122 also stores this inverse submatrix $\hat{H}^{-1}{}_{updated}$ for subcarrier k in the buffer 124.

Then, the interference canceller 58 updates $y_{updated}$ per equation (8) or in another suitable manner, and the channel-estimation updater 60 updates $\hat{H}_{updated}$ per equation (10) or in another suitable manner.

Next, the symbol detector 122 generates an inverse submatrix $\hat{H}^{-1}{}_{updated}$ corresponding to the subsymbol carried by the subcarrier k having the second highest SIR. The symbol detector may choose the subcarrier k from the original ordering provided by the ICI detector 120, or the ICI detector may recalculate the SIRs of the subcarriers of the remaining undetected subsymbols $\hat{x}(k)$ and reorder them as appropriate based on $\hat{H}_{updated}$. Furthermore, if the subcarrier k having the second highest SIR is within ±v subcarriers of the subcarrier of the previously detected subsymbol $\hat{x}(k)$, then the symbol detector 122 may retrieve the inverse submatrix for the previously detected subsymbol from the buffer 124, and use this retrieved inverse submatrix to calculate another inverse submatrix on $\hat{H}_{updated}$ for the present subcarrier k. But if the present subcarrier k is not within ±v subcarriers of the previous subcarrier, then the detector 122 may calculate the inverse submatrix for the present subcarrier k without the benefit of using a previously calculated inverse submatrix.

Then, using the calculated inverse submatrix $\hat{H}^{-1}{}_{updated}$ and $y_{updated}$, the detector 122 calculates the estimation $\hat{x}(k)$ of the subsymbol transmitted on the subcarrier k. The symbol detector 122 also stores this inverse submatrix $\hat{H}^{-1}{}_{updated}$ for the subcarrier k in the buffer 124.

Next, the interference canceller 58 updates $y_{updated}$ per equation (9) or in another suitable manner, and the channel-estimation updater 60 updates $\hat{H}_{updated}$ per equation (11) or in another suitable manner.

Then, the detector 122 detects the remaining subsymbols $\hat{x}(k)$ in a manner similar to that described above for the subsymbol associated with the subcarrier k having the second highest SIR. If for a subcarrier k there are multiple inverse submatrices stored in the buffer 124 for other subcarriers within ±v subcarriers of k, then the detector 122 may select the inverse submatrix associated with the closest of these subcarriers from which to generate the inverse submatrix for the subcarrier k. For example, if the buffer 124 stores inverse submatrices associated with k+1 and k−5, then the detector 122 may select the inverse submatrix associated with k+1.

It is estimated that, in an embodiment, 50%-90% of the time the buffer 124 stores at least one inverse submatrix that is within ±v subcarriers of the subcarrier k currently undergoing detection. Therefore, the time savings in detection time compared to a symbol detector that does not have the buffer 124 may be significant.

Still referring to FIG. 11, alternate embodiments are contemplated. For example, the data-recovery unit 38 may use techniques in addition to the above-described technique to detect one or more of the estimated subsymbols) $\hat{x}(k)$, e.g., as described above in conjunction with FIG. 10.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A data-recovery apparatus, comprising:
   a generator configured to calculate a first value that is related to a level of interference at a carrier frequency of a multi-carrier signal received over a channel;
   a comparator configured to compare a second value to a third value, the second value being related to the first value, and the third value being related to a response of the channel at the carrier frequency; and
   a detector configured to recover a data value transmitted at the carrier frequency from a data value received at the carrier frequency, the detector configured to recover the transmitted data value according to a first algorithm if the second value has a first mathematical relationship to the third value, and configured to recover the transmitted data value according to a second algorithm if the second value has a second mathematical relationship to the third value.

2. The apparatus of claim 1 wherein the first value includes an estimated maximum value of inter-carrier interference at the carrier frequency caused by at least one value transmitted at a respective at least one carrier frequency adjacent to the carrier frequency of the transmitted data.

3. The apparatus of claim 1 wherein the first value includes an estimation of a maximum value of inter-carrier interference at the carrier frequency caused by values transmitted at a number of carrier frequencies that are adjacent to, and that are higher than and lower than, the carrier frequency of the transmitted data value.

4. The apparatus of claim 1 wherein the first value includes an estimation of a variance of inter-carrier interference at the carrier frequency caused by at least one value transmitted at a respective at least one carrier frequency adjacent to the carrier frequency of the transmitted data value.

5. The apparatus of claim 1 wherein the first value includes an estimation of a variance of inter-carrier interference at the carrier frequency caused by at least one value transmitted at a respective at least one carrier frequency that is adjacent to, and higher than, the carrier frequency of the transmitted data value.

6. The apparatus of claim 1 wherein the first value includes an estimation of a variance of inter-carrier interference at the carrier frequency caused by at least one value transmitted at a respective at least one carrier frequency that is adjacent to, and lower than, the carrier frequency of the transmitted data value.

7. The apparatus of claim 1 wherein the level of interference includes a level of inter-carrier interference.

8. The apparatus of claim 1 wherein the channel includes a wireless channel.

9. The apparatus of claim 1 wherein the second value equals a product of the first value and a constant.

10. The apparatus of claim 1 wherein the second value equals a product of the first value and $\sqrt{2}$.

11. The apparatus of claim 1 wherein the second value equals a product of the first value, $\sqrt{2}$, and a number in the range of approximately 1 to 1.5.

12. The apparatus of claim 1 wherein the second value equals a product of a square root of the first value and a fourth value that is related to an error rate of the first algorithm.

13. The apparatus of claim 1 wherein the third value equals the squared absolute value of the channel response at the carrier frequency of the transmitted data value.

14. The apparatus of claim 1 wherein the third value equals a product of a constant and the squared absolute value of the channel response at the carrier frequency of the transmitted data value.

15. The apparatus of claim 1 wherein the third value equals a product of $1/(\sqrt{2})$ and the squared absolute value of the channel response at the carrier frequency of the transmitted data value.

16. The apparatus of claim 1 wherein the recovered data value includes a recovered data symbol.

17. The apparatus of claim 1 wherein:
   the channel response at the carrier frequency of the transmitted data value includes an estimated channel response at the carrier frequency; and
   the first algorithm includes setting the recovered data value equal to a product of the received data value and a conjugate of the estimated channel response at the carrier frequency.

18. The apparatus of claim 1 wherein:
   the channel response at the carrier frequency of the transmitted data value includes an estimated channel response at the carrier frequency; and
   the first algorithm includes setting the recovered data value equal to a quotient of a product over a sum, the product being of the received data value and a conjugate of the estimated channel response at the carrier frequency, and the sum being of the squared absolute value of the estimated channel response at the carrier frequency and an estimated variance of interference at the carrier frequency.

19. The apparatus of claim 1 wherein the relationship includes the second value being less than the third value.

20. The apparatus of claim 1 wherein the relationship includes the second value being greater than the third value.

21. The apparatus of claim 1, further comprising an updater configured to update, in response to the detector recovering the transmitted data value according to the first algorithm, an array of channel-response values by zeroing a section of the array corresponding to the carrier frequency of the transmitted data value.

22. The apparatus of claim 1, further comprising an updater configured to update, in response to the detector recovering the transmitted data value according to the first algorithm, an array of channel-response values by zeroing a column of the array corresponding to the carrier frequency of the transmitted data value.

23. The apparatus of claim 1, further comprising an updater configured to update, in response to the detector recovering the transmitted data value according to the first algorithm, a vector of received data values by subtracting from the vector a product of the recovered data value and a section of an array of channel-response values, the section corresponding to the carrier frequency of the transmitted data value.

24. The apparatus of claim 1 wherein the detector is configured to recover the transmitted data value according to the second algorithm if the second value does not have the first relationship to the third value.

25. A system, comprising:
a receiver, including
an input node configured to receive over a channel a multi-carrier receive signal; and
a data-recovery apparatus, including
a generator configured to calculate a first value that is related to a level of interference at a carrier frequency of the multi-carrier signal;
a comparator configured to compare a second value to a third value, the second value being related to the first value, and the third value being related to a response of the channel at the carrier frequency; and
a detector configured to recover a data value transmitted at the carrier frequency from a data value received at the carrier frequency, the detector configured to recover the transmitted data value according to an algorithm if the second value has a mathematical relationship to the third value and to another algorithm if the second value does not have the mathematical relationship to the third value.

26. The system of claim 25, further comprising at least one transmitter configured to transmit a multi-carrier transmit signal.

27. The system of claim 25, further comprising at least one antenna coupled to the input node.

28. The system of claim 25, further comprising a transformer coupled between the input node and the generator and configured to generate a respective frequency-domain coefficient for each of the carrier frequencies of the signal.

29. A method, comprising:
receiving a multi-carrier signal over a channel;
estimating an indicator of interference at a carrier frequency of the signal;
estimating an indicator of a response of the channel at the carrier frequency;
comparing the indicator of interference with the channel response; and
recovering a data value transmitted at the carrier frequency from a data value received at the carrier frequency according to an algorithm if the indicator of interference has a mathematical relationship to the indicator of the response of the channel and according to another algorithm if the indicator of the interference does not have the mathematical relationship to the indicator of the response of the channel.

30. The method of claim 29 wherein receiving the signal includes receiving the signal over multiple paths within the channel.

31. The method of claim 29 wherein receiving the signal includes receiving the signal at a first location that is moving relative to a second location from which the signal is being transmitted.

32. The method of claim 29 wherein estimating the indicator of interference includes estimating a maximum value of inter-carrier interference at the carrier frequency of the transmitted data value caused by at least one other value transmitted at a respective at least one carrier frequency adjacent to the carrier frequency of the transmitted data value.

33. The method of claim 32 wherein the at least one other value includes another data value.

34. The method of claim 32 wherein the at least one other value includes a pilot value.

35. The method of claim 29 wherein estimating the indicator of interference includes estimating a root of a variance of inter-carrier interference at the carrier frequency caused by at least one value transmitted at a respective at least one carrier frequency adjacent to the carrier frequency of the transmitted data value.

36. The method of claim 29 wherein the channel includes a wireless channel.

37. The method of claim 29 wherein estimating the indicator of the channel response includes squaring an absolute value of an estimated channel response at the carrier frequency of the transmitted data value.

38. The method of claim 29 wherein recovering the data value includes recovering a data symbol transmitted at the carrier frequency.

39. The method of claim 29, further comprising:
estimating the channel response at the carrier frequency; and
wherein recovering the transmitted data value with the algorithm includes setting the recovered data value equal to a product of the received data value and a conjugate of the estimated channel response at the carrier frequency.

40. The method of claim 29, further comprising:
estimating a variance of interference at the carrier frequency;
estimating the channel response at the carrier frequency; and
wherein recovering the transmitted data value with the algorithm includes setting the recovered data value equal to a quotient of a product over a sum, the product being of the received data value and a conjugate of the estimated channel response, and the sum being of the squared absolute value of the estimated channel response and the estimated variance of interference.

41. The method of claim 29 wherein the relationship includes the indicator of interference being less than the indicator of the response of the channel.

42. The method of claim 29 wherein the relationship includes the indicator of interference being greater than the indicator of the response of the channel.

43. The method of claim 29, further comprising:
generating an array of channel response values; and
in response to the indicator of interference having the relationship to the indicator of the response of the channel, updating the array by zeroing a section of the array corresponding to the carrier frequency of the transmitted data value.

44. The method of claim 29, further comprising:
generating an array of channel response values; and
in response to the indicator of interference having the relationship to the indicator of the response of the channel, updating a vector of received data values by subtracting from the vector a product of the recovered data value and a section of the array of channel response values, the section corresponding to the carrier frequency of the transmitted data value.

45. A non-transitory computer-readable medium, comprising:
stored instructions that, when executed by at least one computing apparatus, cause the at least one computing apparatus
to calculate a first value that is related to a level of interference at a carrier frequency of a multi-carrier signal received over a channel;

to compare a second value to a third value, the second value being related to the first value, and the third value being related to a response of the channel at the carrier frequency; and to recover a data value transmitted at the carrier frequency from a data value received at the carrier frequency according to a first algorithm if the second value has a first mathematical relationship to the third value and according to a second algorithm if the second value does not have the first mathematical relationship to the third value.

46. The non-transitory computer-readable medium of claim 45 wherein the stored instructions, when executed by at least one computing apparatus, cause the at least one computing apparatus to update, in response to recovering the transmitted data value according to the first algorithm, an array of channel-response values by zeroing a section of the array corresponding to the carrier frequency of the transmitted data value.

47. The non-transitory computer-readable medium of claim 45 wherein the stored instructions, when executed by at least one computing apparatus, cause the at least one computing apparatus to update, in response to recovering the transmitted data value according to the first algorithm, an array of channel-response values by zeroing a column of the array corresponding to the carrier frequency of the transmitted data value.

48. The non-transitory computer-readable medium of claim 45 wherein the stored instructions, when executed by at least one computing apparatus, cause the at least one computing apparatus to update, in response to recovering the transmitted data value according to the first algorithm, a vector of received data values by subtracting from the vector a product of the recovered data value and a section of an array of channel-response values, the section corresponding to the carrier frequency of the transmitted data value.

49. The non-transitory computer-readable medium of claim 45 wherein the stored instructions, when executed by at least one computing apparatus, cause the at least one computing apparatus to recover the transmitted data value according to the second algorithm if the second value has a second mathematical relationship to the third value.

* * * * *